US012583289B2

(12) United States Patent
Hara et al.

(10) Patent No.: US 12,583,289 B2
(45) Date of Patent: Mar. 24, 2026

(54) CONSTRUCTION MACHINE

(71) Applicant: Caterpillar SARL, Geneva (CH)

(72) Inventors: Keigo Hara, Akashi (JP); Yutaka Yokoyama, Akashi (JP); Takaaki Imatani, Akashi (JP); Mitsuhiro Toyoda, Akashi (JP); Ken Hiraoka, Akashi (JP); Hiroyuki Shimizu, Akashi (JP)

(73) Assignee: Caterpillar SARL, Geneva (CH)

( * ) Notice: Subject to any disclaimer, the term of this patent is extended or adjusted under 35 U.S.C. 154(b) by 440 days.

(21) Appl. No.: 17/296,478

(22) PCT Filed: Nov. 19, 2019

(86) PCT No.: PCT/EP2019/025402
§ 371 (c)(1),
(2) Date: May 24, 2021

(87) PCT Pub. No.: WO2020/104058
PCT Pub. Date: May 28, 2020

(65) Prior Publication Data
US 2021/0394586 A1　Dec. 23, 2021

(30) Foreign Application Priority Data

Nov. 22, 2018　(JP) ................................. 2018-218899

(51) Int. Cl.
B60H 1/32　(2006.01)
B60H 1/00　(2006.01)
F01P 5/04　(2006.01)

(52) U.S. Cl.
CPC ....... B60H 1/3205 (2013.01); B60H 1/00271 (2013.01); F01P 5/043 (2013.01); B60H 2001/327 (2013.01); F01P 2005/046 (2013.01)

(58) Field of Classification Search
CPC .............. B60H 1/3205; B60H 1/00271; B60H 2001/327; F01P 5/043; F01P 2005/046
(Continued)

(56) References Cited

U.S. PATENT DOCUMENTS 4,930,460 A　　6/1990　Alhara et al.
8,419,512 B2 *　4/2013　Creed ................ B60H 1/00414
　　　　　　　　　　　　　　　　　454/139
(Continued)

FOREIGN PATENT DOCUMENTS

CN　　　103946505　　　7/2014
CN　　　104024610　　　9/2014
(Continued)

OTHER PUBLICATIONS

KR20090116374A English machine translation (Year: 2009).*
(Continued)

*Primary Examiner* — Jenna M Maroney

(57) ABSTRACT

To provide a construction machine capable of reducing the time and labor of an operator and reliably preventing deterioration of cooling efficiency of a heat exchanger unit. A construction machine includes a heat exchanger unit having a plurality of heat exchangers, a cooling fan configured to supply cooling air to the heat exchanger unit during a forward rotation thereof, a controller configured to control an operation of the cooling fan, a timer configured to count an operation time period of forward rotation of the cooling fan, and a reverse rotation signal output switch configured to output to the controller a reverse rotation signal for causing the cooling fan to rotate in the reverse direction in response to an applied manual operation. The controller causes the cooling fan to rotate in the reverse direction for a second predetermined time period and resets the timer at the time of finishing the reverse rotation of the cooling fan, if the operation time period of forward rotation counted by the (Continued)

timer reaches a first predetermined time period, and controller causes the cooling fan to rotate in the reverse direction for the second predetermined time period when the reverse rotation signal is output from the reverse rotation signal output switch, and resets the timer at the time of finishing the reverse rotation of the cooling fan, even if the operation time period of forward rotation counted by the timer has not reached the first predetermined time period.

3 Claims, 3 Drawing Sheets

(58) Field of Classification Search
     USPC ........................................................ 165/202
     See application file for complete search history.

(56)                References Cited

U.S. PATENT DOCUMENTS

| | | | | |
|---|---|---|---|---|
| 8,967,239 | B2 * | 3/2015 | Schertz ................ | B60H 1/3227 |
| | | | | 454/75 |
| 9,255,386 | B2 * | 2/2016 | Kikuchi ............. | B60H 1/00828 |
| 2002/0003381 | A1 * | 1/2002 | Nelson ................ | F04D 25/0646 |
| | | | | 310/67 R |
| 2004/0089006 | A1 * | 5/2004 | Kamiya ............... | B60H 1/3407 |
| | | | | 62/244 |
| 2005/0183417 | A1 | 8/2005 | Nakagawa et al. | |
| 2008/0108032 | A1 * | 5/2008 | Tuhy ........................ | F01P 5/043 |
| | | | | 434/245 |
| 2009/0217655 | A1 * | 9/2009 | Yabuki ................... | F01P 7/044 |
| | | | | 123/563 |

| | | | | |
|---|---|---|---|---|
| 2012/0304944 | A1 * | 12/2012 | Nelson ................... | F01P 5/043 |
| | | | | 165/200 |
| 2014/0033693 | A1 * | 2/2014 | Nelson .................. | E02F 9/2285 |
| | | | | 60/416 |
| 2014/0060099 | A1 * | 3/2014 | Kitaoka ............. | B60H 1/00435 |
| | | | | 62/177 |
| 2015/0017901 | A1 * | 1/2015 | Pfohl .................... | E02F 9/2095 |
| | | | | 180/68.2 |
| 2015/0273976 | A1 * | 10/2015 | Enomoto .............. | B60L 3/0046 |
| | | | | 62/243 |
| 2020/0011025 | A1 * | 1/2020 | Hyodo .................... | E02F 9/226 |

FOREIGN PATENT DOCUMENTS

| | | | |
|---|---|---|---|
| EP | 2694788 | A2 | 10/2012 |
| JP | 1999091366 | | 4/1999 |
| JP | 2007182710 | A | 7/2007 |
| JP | 4825006 | B2 * | 11/2011 |
| JP | 4922053 | B2 * | 4/2012 |
| JP | 2014167286 | | 9/2014 |
| JP | 2014167286 | A * | 9/2014 |
| JP | 6124674 | B2 * | 5/2017 |
| KR | 20090116374 | A * | 11/2009 |

OTHER PUBLICATIONS

JP-4922053-B2 English machine translation (Year: 2012).*
JP4825006B2 English Machine Translation (Year: 2011).*
International Search Report related to Application No. PCT/EP2019/025402; reported on Mar. 6, 2020.
Chinese Patent Office First Office Action Report for Chinese Patent Appln. No. 201980076598.3, mailed Feb. 24, 2023 (7 pgs).

* cited by examiner

CONSTRUCTION MACHINE

CROSS-REFERENCE TO RELATED APPLICATION

This Application is a 35 USC § 371 US National Stage filing of International Application No. PCT/EP2019/025402 filed on Nov. 19, 2019 which claims benefit and priority of Japanese Patent Application No. 2018-218899 filed on Nov. 22, 2018.

TECHNICAL FIELD

The present invention relates to a construction machine capable of removing debris from a heat exchanger unit by causing a cooling fan to rotate in a reverse direction.

BACKGROUND ART

An engine room of a construction machine such as a hydraulic excavator is typically provided with a heat exchanger unit having a plurality of heat exchangers configured to cool various fluids, and a cooling fan configured to supply cooling air to the heat exchanger unit. The heat exchanger unit includes a radiator for cooling engine cooling water, an oil cooler configured to cool hydraulic oil for operating a hydraulic actuator, and the like. The cooling air generated by the cooling fan cools various fluids, which pass through each of the plurality of heat exchangers, passes through the engine room, and is discharged to the outside of the engine room.

A large amount of debris such as dusts, fine wood chips and other foreign matters may be floating at a construction site where construction machines are operating. When the construction machines are operating at such a construction site, the debris may be carried by the cooling air of the cooling fan, and the debris may deposit on the heat exchanger unit, which may deteriorate the cooling efficiency of the heat exchangers. Thus, some construction machines are designed to blow away debris that has deposited on the heat exchanger unit by causing the cooling fan to rotate in a reverse direction in order to prevent deterioration of the cooling efficiency of the heat exchanger unit. The reverse rotation of the cooling fan is performed for a required time period, for example, by manually operating a reverse rotation switch by a construction machine operator or performed at a predetermined interval by a controller mounted on the construction machine (e.g. Patent Literature 1).

PRIOR ART LITERATURES

Patent Literatures

[Patent Literature 1 Japanese Patent Application Laid-Open No. 2007-182710

SUMMARY OF THE INVENTION

Problems to be Solved by the Invention

However, if the reverse rotation of the cooling fan is designed to be operated by operating a reverse rotation switch, it would be troublesome for an operator to periodically operate the reverse rotation switch. When the operator should forget to operate the reverse rotation switch, debris may deposit on the heat exchanger unit, and may lead to deterioration of the cooling efficiency. On the other hand, if the reverse rotation of the cooling fan is designed to be operated at every predetermined time period by a controller; in a construction site where there is a relatively large amount of debris, a large amount of debris may adhere to the heat exchanger unit before the predetermined time period elapses, and may lead to the deterioration of the cooling efficiency.

An object of the present invention made in consideration of the aforementioned fact is to provide a construction machine capable of reducing the time and labor of an operator and reliably preventing a decline of the cooling efficiency of a heat exchanger unit.

Means for Solving the Problems

In order to solve the aforementioned problem, the present invention provides the following construction machine. That is, the construction machine includes a heat exchanger unit having a plurality of heat exchangers; a cooling fan configured to supply cooling air to the heat exchanger unit during a forward rotation thereof; a controller configured to control an operation of the cooling fan; a timer configured to count an operation time period of forward rotation of the cooling fan; and a reverse rotation signal output switch configured to output to the controller a reverse rotation signal for causing the cooling fan to rotate in a reverse direction in response to an applied manual operation, wherein the controller causes the cooling fan to rotate in the reverse direction for a second predetermined time period and resets the timer at the time of finishing the reverse rotation of the cooling fan, if the operation time period of forward rotation counted by the timer reaches a first predetermined time period, and the controller causes the cooling fan to rotate in the reverse direction for the second predetermined time period when the reverse rotation signal is output from the reverse rotation signal output switch, and resets the timer at the time of finishing the reverse rotation of the cooling fan, even if the operation time period of forward rotation counted by the timer has not reached the first predetermined time period.

The construction machine further includes a compressor configured to compress refrigerant for an air conditioner; and a condenser configured to condense the refrigerant compressed by the compressor, wherein the heat exchanger unit includes the condenser, and the controller preferably stops the operation of the compressor when causing the cooling fan to rotate in the reverse direction. The construction machine further suitably includes a filter disposed on the upstream side of the heat exchanger unit during the forward rotation of the cooling fan.

Advantageous Effects of the Invention

In the construction machine provided by the present invention, when the operation time period of forward rotation counted by the timer reaches the first predetermined time period, the cooling fan is rotated in the reverse direction by the controller for the second predetermined time period. As a result, in a construction site where there is a relatively small amount of debris, the operator does not need to operate the reverse rotation signal output switch, so that the time and labor of the operator can be reduced, and thereby deterioration of the cooling efficiency of the heat exchanger unit can be reliably prevented.

In the construction machine of the present invention, the cooling fan is rotated in the reverse direction by the controller for the second predetermined time period when a reverse rotation signal is output from the reverse rotation signal output switch, even if the operation time period of forward rotation counted by the timer has not reached the first predetermined time period. As a result, in a construction site where there is a relatively large amount of debris, the deterioration of the cooling efficiency of the heat exchanger unit can be reliably prevented by the operator operating the reverse rotation signal output switch at an appropriate timing.

Furthermore, in the construction machine of the present invention, not only when the cooling fan is rotated in the reverse direction due to the operation time period of forward rotation reaching the first predetermined time period, but also when the cooling fan is rotated in the reverse direction due to the operation of the reverse rotation signal output switch by the operator, the timer is reset by the controller at the time of finishing the reverse rotation of the cooling fan, so that the cooling fan is never rotated in the reverse direction at shorter time intervals than required.

BRIEF DESCRIPTION OF THE INVENTION

DETAIL DESCRIPTION OF EMBODIMENTS

Figure 1:
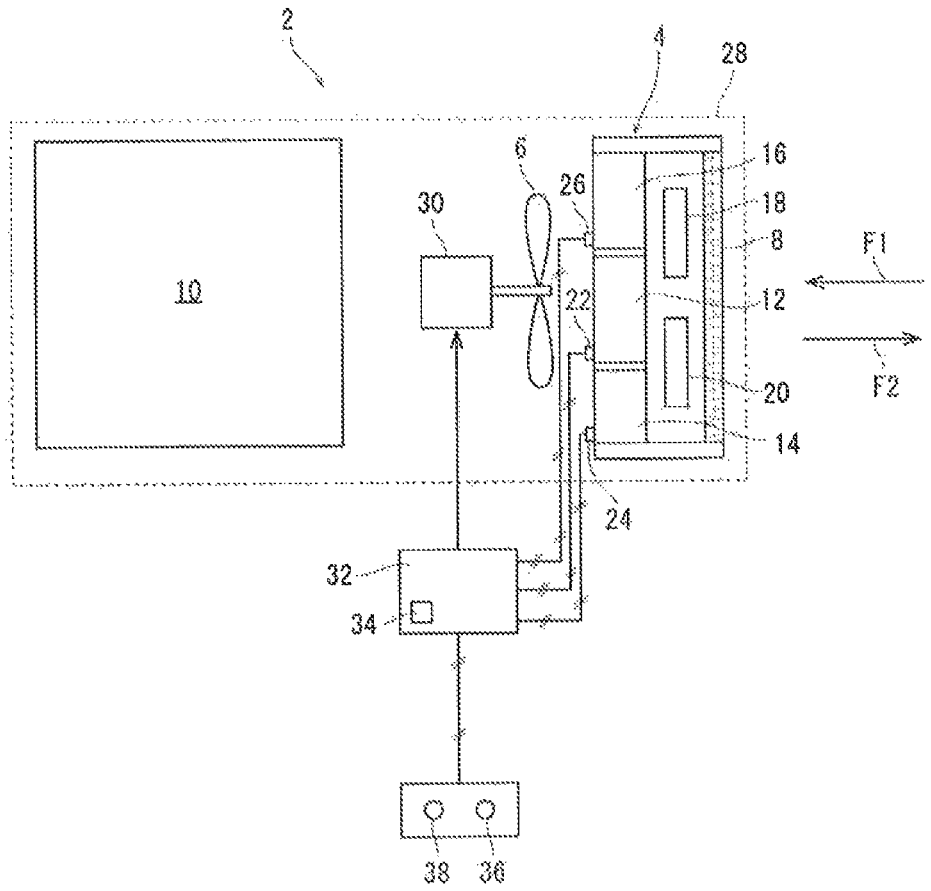
FIG. 1 is a block diagram illustrating a part of configuration of a construction machine configured in accordance with the present invention.

Hereinbelow, embodiments of a construction machine configured in accordance with the present invention will be described while referring to the drawings.

Referring to FIG. 1, a construction machine denoted as a whole by a reference numeral 2 includes a heat exchanger unit 4 having a plurality of heat exchangers, a cooling fan 6 configured to supply cooling air to the heat exchanger unit 4 at a forward rotation, and a filter 8 disposed on the upstream side of the heat exchanger unit 4 at the forward rotation of the cooling fan 6.

The heat exchanger unit 4 of an illustrated embodiment includes a radiator 12 allowing cooling water of an engine 10 for driving a hydraulic pump (not illustrated) to pass therethrough, an oil cooler 14 allowing hydraulic oil for operating hydraulic actuators (not illustrated) such as hydraulic cylinders and hydraulic motors to pass therethrough, an aftercooler 16 allowing air, which has been compressed by a supercharger (not illustrated), to pass therethrough, a condenser 18 allowing refrigerant for air-conditioner to pass therethrough, and a fuel cooler 20 allowing fuel to pass therethrough. The heat exchanger unit 4 does not need to include all of the aforementioned plurality of heat exchangers such as the radiator 12; instead one or more of the plurality of heat exchangers may be enough. Alternatively, the heat exchanger unit 4 may include any heat exchanger other than the aforementioned heat exchangers. In addition, the plurality of heat exchangers can be arbitrarily arranged.

As illustrated in FIG. 1, the construction machine 2 is provided with a cooling water temperature sensor 22 configured to detect temperatures of engine cooling water, a hydraulic oil temperature sensor 24 configured to detect temperatures of hydraulic oil, and an air temperature sensor 26 configured to detect temperatures of compressed air, which is cooled by passing through the aftercooler 16 after having been compressed by the supercharger. The cooling water temperature sensor 22 may be disposed on a further upstream side of an engine thermostat (not illustrated) located upstream of the radiator 12. The hydraulic oil temperature sensor 24 may be disposed on a further downstream side of a hydraulic oil tank (not illustrated) located downstream of the oil cooler 14. The air temperature sensor 26 may be disposed downstream of the aftercooler 16.

Although not illustrated, the construction machine 2 is provided with a cab allowing an operator to get on board, and an air conditioner for cab. The air conditioner for cab includes an exterior device arranged outside the cab, and an interior device arranged inside the cab. The exterior device includes a compressor configured to compress the refrigerant, the condenser 18 configured to condense the refrigerant that has been compressed by the compressor, and a receiver configured to store the refrigerant that has been condensed by the condenser 18. On the other hand, the interior devise includes an expansion valve configured to expand the refrigerant sent from the receiver, and an evaporator configured to evaporate the refrigerant that has been expanded by the expansion valve. The air conditioner is activated or stopped by the operation of an air conditioner switch arranged inside the cab.

The cooling fan 6 of the illustrated embodiment is disposed adjacent to the heat exchanger unit 4 in the engine room 28 indicated by a dotted line in FIG. 1 and is driven by an appropriate driving source 30 such as an electric motor or a hydraulic motor. During the forward rotation of the cooling fan 6, an air flow is generated in a direction indicated by an arrow F1 in FIG. 1, and the cooling air is supplied to the heat exchanger unit 4. As a result, various fluids passing through the heat exchangers of the heat exchanger unit 4 are cooled, and the cooling air passes through the engine room 28 and is discharged out of the engine room 28. Further, during the reverse rotation of the cooling fan 6, an air flow is generated in a direction indicated by an arrow F2 in FIG. 1. In the illustrated embodiment, the single cooling fan 6 is provided, but a plurality of the cooling fans 6 may be provided.

As understood by referring to FIG. 1, a filter 8 is disposed on the upstream side of the heat exchanger unit 4 during the forward rotation of the cooling fan 6, and collects debris such as dusts or wood chips or other foreign matters to prevent the debris from accumulating on the fins of the heat exchanger such as the radiator 12. The debris collected by the filter 8 is blown away and removed from the filter 8 by the reverse rotation of the cooling fan 6. If such the filter 8 is disposed on the upstream side of the heat exchanger unit 4, when the operator removes the debris by cleaning, which has not been removed by the rotation in the reverse direction of the cooling fan 6 and slightly remaining behind, the operator does not need to clean the fins of the respective heat exchangers of the heat exchanger unit 4, but only needs to clean the filter 8. As a result, the improvement of maintenance workability can be achieved. However, it is not essential but optional that the construction machine 2 be provided with the filter 8. If the construction machine 2 is not provided with the filter 8, most of the debris that has deposited on the heat exchanger unit 4 is blown off and removed by the reverse rotation of the cooling fan 6.

Furthermore, the construction machine 2 includes a controller 32 configured to control the operation of the cooling fan 6, a timer 34 configured to count the operation time period of forward rotation of the cooling fan 6, and a reverse rotation signal output switch 36 configured to output to the controller 32 a reverse rotation signal for causing the cooling fan 6 to rotate in the reverse direction in response to the applied manual operation.

The controller 32 is composed of a computer. When the driving source 30 of the cooling fan 6 is an electric motor, the driving source 30 and the controller 32 are electrically connected to each other, and the controller 32 controls the operation of the cooling fan 6 by outputting a forward rotation signal or a reverse rotation signal to the driving source 30. Further, when the driving source 30 is a hydraulic motor, an electromagnetic control valve (not illustrated), configured to control the supply of hydraulic oil to the driving source 30, and the controller 32 are electrically connected to each other. Then, the controller 32 outputs a forward rotation signal or a reverse rotation signal to the electromagnetic control valve to switch between oil passages of the electromagnetic control valve, thereby causing the driving source 30 to run in a forward or reverse direction, and controlling the operation of the cooling fan 6. As illustrated in FIG. 1, the controller 32 is electrically connected to each of temperature sensors 22, 24, 26, and each of fluid temperatures detected by each of the temperature sensors 22, 24, 26 is input to the controller 32.

The timer 34 is configured to count a time period during which a forward rotation signal is output from the controller 32 to the driving source 30 or to the electromagnetic control valve. The timer 34 may be incorporated in the controller 32 or may be attached to the construction machine 2 separately from the controller 32 and may be electrically connected to the controller 32.

The reverse rotation signal output switch 36 is arranged in the cab and is electrically connected to the controller 32. Further, the reverse rotation signal output switch 36 can be of any type, and for example, a touch panel type, a push button type, a dial type, a seesaw type or the like may be adopted.

In the construction machine 2 as described above, in case of satisfying an operating condition such as temperatures of various fluids e.g. engine cooling water and hydraulic oil passing through the heat exchanger unit 4 being equal to or higher than a predetermined value, when the engine 10 is started (operating condition for preventing overcooling of various fluids), a forward rotation signal is output from the controller 32 to the driving source 30 or the electromagnetic control valve and the cooling fan 6 is caused to rotate in a forward direction, and thereby the cooling air is supplied to the heat exchanger unit 4.

Then, if the operation time period of forward rotation counted by the timer 34 reaches a first predetermined time period (for example, 20 minutes), the controller 32 outputs a reverse rotation signal to the driving source 30 or the electromagnetic control valve to cause the cooling fan 6 to rotate in the reverse direction for a second predetermined time period (for example, 1 minute), and resets the timer 34 when the reverse rotation of the cooling fan 6 is terminated. It is preferable that the first predetermined time period and the second predetermined time period can be arbitrarily setting-changeable. In addition, an automatic mode ON/OFF switch 38 for activating or stopping a mode for causing the cooling fan 6 to rotate in the reverse direction periodically by the controller 32 in this manner (hereinafter referred to as "automatic mode") may be arranged in the cab.

Further, the controller 32 outputs a reverse rotation signal to the driving source 30 or the electromagnetic control valve to cause the cooling fan 6 to rotate in the reverse direction for the second predetermined time period and resets the timer 34 at the time of finishing the reverse rotation of the cooling fan 6, when the reverse rotation signal output switch 36 is operated by the operator in the cab, and a reverse rotation signal is output from the reverse rotation signal output switch 36, even if the operation time period of forward rotation counted by the timer 34 has not reached the first predetermined time period.

Regarding conditions for causing the cooling fan 6 to rotate in the reverse direction in the automatic mode, any condition other than the operation time period of forward rotation reaching the first predetermined time period may be added. Further, regarding conditions for causing the cooling fan 6 to rotate in the reverse direction due to the operation of the reverse rotation signal output switch 36, any condition other than the operation of the reverse rotation signal output switch 36 may be added.

Next, an example of the reverse rotation processing of the cooling fan 6 executed by the controller 32 of the construction machine 2 will be described with reference to FIG. 2 and FIG. 3.

Figure 2:
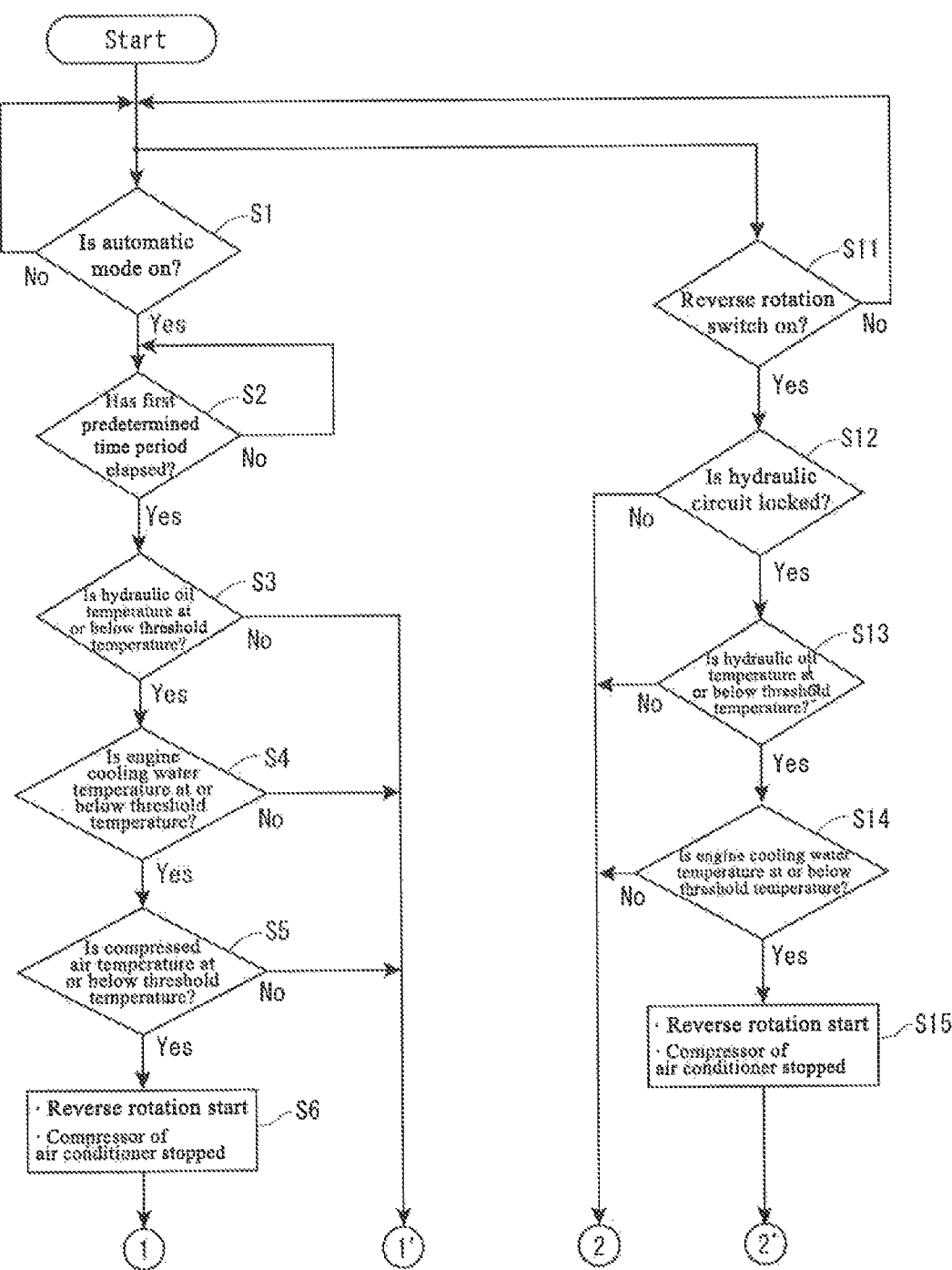
FIG. 2 is the first half of a flowchart illustrating reverse rotation processing of the cooling fan performed by the controller illustrated in FIG. 1.
Figure 3:
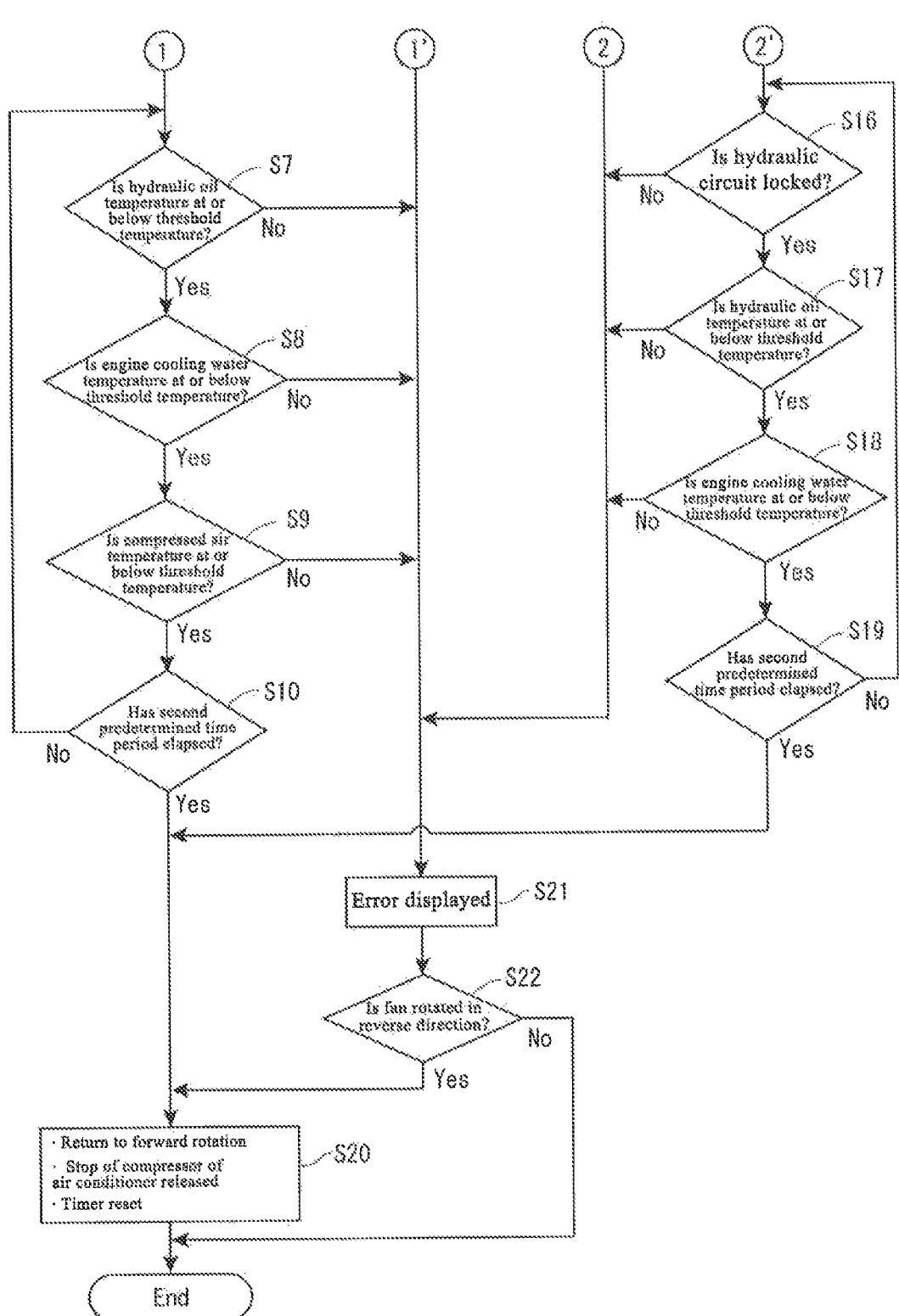
FIG. 3 is the second half of a flowchart illustrating reverse rotation processing of the cooling fan performed by the controller illustrated in FIG. 1.

As illustrated in FIG. 2, first, it is determined whether an automatic mode is activated (step S1), and it is also determined whether a reverse rotation signal is output from the reverse rotation signal output switch 36 (step S11). If the automatic mode is activated (YES in step S1) and no reverse rotation signal is output from the reverse rotation signal output switch 36 (NO in step S11), the processing advances to step S2. On the other hand, if the determination in step S11 is YES, the processing advances to step S12, regardless of whether the determination in step S1 is YES or No.

A case where the processing advances to step S2 will be described. In step S2, it is determined whether the operation time period of forward rotation counted by the timer 34 has reached the first predetermined time period. If the determination in step S2 is YES, the processing advances to step S3. On the other hand, if the determination in step S2 is No, step S2 is repeated until the determination in step S2 becomes YES.

In step S3, it is determined whether a hydraulic oil temperature detected by the hydraulic oil temperature sensor 24 is at or below a threshold temperature. If the determination in step S3 is YES, it is determined whether an engine coolant temperature detected by the coolant temperature sensor 22 is at or below a threshold temperature (step S4). If the determination in step S4 is YES, it is determined whether a temperature of the compressed air detected by the air temperature sensor 26 is at or below a threshold temperature (step S5).

If the determination in step S5 is YES, a reverse rotation signal is output from the controller 32, and the cooling fan 6 starts to rotate in the reverse direction (step S6). This will cause the debris collected by the filter 8 to be blown away and removed from the filter 8. Alternatively, if the filter 8 is not provided, the debris that has deposited on the heat exchanger unit 4 is blown away and removed from the heat exchanger unit 4.

In step S6, it is preferable that the compressor of the air conditioner is stopped by the controller 32 as soon as the cooling fan 6 starts to rotate in the reverse direction. When the cooling fan 6 rotates in the reverse direction, the air, which has been heated by passing through the periphery of the engine 10, the radiator 12, the oil cooler 14, and the aftercooler 16, passes through the condenser 18, so that the refrigerant for air conditioner is in turn heated. If the refrigerant is heated excessively during the operation of the air conditioner, an excessive load is applied to the air conditioner system, and thereby the air conditioner may break down. For this reason, it is necessary to stop the air conditioner when the cooling fan 6 is rotated in the reverse direction, but it is troublesome for the operator to stop the air conditioner at every time before the cooling fan 6 starts to rotate in the reverse direction, and the operator may forget sometimes the stop operation. Therefore, in step S6, with the start of reverse rotation of the cooling fan 6, it is preferable to stop the compressor of the air conditioner to stop the flow of the refrigerant, thereby enabling preventing an excessive load from being applied on the air conditioner.

Explaining with reference to FIG. 3, after step S6 is executed, it is determined whether the hydraulic oil temperature is at or below the threshold temperature (step S7), whether the engine coolant temperature is at or below the threshold temperature (step S8), and whether the temperature of the compressed air is at or below the threshold temperature (step S9), respectively. If each of the determinations from step S7 to S9 is YES, it is determined whether the second predetermined time period has elapsed from the start of reverse rotation of the cooling fan 6 (step S10). Then, the cooling fan 6 continues to rotate in the reverse direction until the second predetermined time period elapses, and each of the determinations from steps S7 to S9 is repeated. When the second predetermined time period has elapsed from the start of reverse rotation of the cooling fan 6, the cooling fan 6 returns to the forward rotation, the timer 34 configured to count the operation time period of forward rotation is reset, and in an example illustrated in FIG. 2 and FIG. 3, the stoppage of the compressor of the air conditioner is released (step S20).

In such an automatic mode ON, when any of the determinations from steps S3 to S5 and steps S7 to S9 is No, a warning is given to the operator, for example, by displaying an error on a monitor (not illustrated) in the cab (step S21), and it is determined whether the cooling fan 6 is rotated in the reverse direction (step S22). If the cooling fan 6 has been rotated in the reverse direction, then step S20 is executed, and if the cooling fan 6 has not been rotated in the reverse direction, the processing is terminated.

Hereinbelow, a case where the determination of step S11 is YES and the processing advances to step S12 will be described. In step S12, it is determined whether the hydraulic circuit is locked. That is, in step S12, it is determined whether various hydraulic actuators such as a hydraulic cylinder or a hydraulic motor are adapted not to be operated, even when an operation is applied by the operator to an operating tool (not illustrated) for operating hydraulic actuators.

If the determination in step S12 is YES, it is determined whether the hydraulic oil temperature is at or below the threshold temperature (step S13). If the determination in step S13 is YES, it is determined whether the engine cooling water temperature is at or below the threshold temperature (step S14). In the example illustrated in FIG. 2 and FIG. 3, in a case where the reverse rotation signal output switch 36 is operated, locking the hydraulic circuit in step S12 is an operating condition for starting the cooling fan 6 to rotate in the reverse direction. Therefore, the hydraulic actuator is never operated when the cooling fan 6 rotates in the reverse direction and the load on the engine 10 is relatively small. Accordingly, determination whether the compressed air temperature is at or below the threshold temperature will not be performed.

If the determination in step S14 is YES, a reverse rotation signal is output from the controller 32, and the compressor of the air conditioner is stopped by the controller 32, as soon as the cooling fan 6 starts to rotate in the reverse direction.

After step S15 is executed, it is determined whether the hydraulic circuit is locked (step S16), whether the hydraulic oil temperature is at or below the threshold temperature (step S17), and whether the engine coolant temperature is at or below the threshold temperature (step S18), respectively. If each of the determinations from step S16 to S18 is YES, it is determined whether the second predetermined time period has elapsed from the start of reverse rotation of the cooling fan 6 (step S19). Then, the reverse rotation of the cooling fan 6 continues until the second predetermined time period elapses, and each of the determinations from step S16 to S18 is repeated. When the second predetermined time period elapses from the start of reverse rotation of the cooling fan 6, the cooling fan 6 returns to forward rotation, and the timer 34 configured to count the operation time period of forward rotation is reset. Concurrently, the stoppage of the compressor of the air conditioner is released (step S20).

When any of the determinations from steps S12 to S14 and steps S16 to S18 is No, in a case where such the reverse rotation signal output switch 36 is operated, a warning is given to the operator (step S21), and it is determined whether the cooling fan 6 is rotated in the reverse direction (step S22). If the cooling fan 6 has been rotated in the reverse direction, step S20 is executed, and if the cooling fan 6 has not been rotated in the reverse direction, the process is terminated.

As described above, in the illustrated embodiment, when the operation time period of forward rotation counted by the timer 34 reaches the first predetermined time period, the controller 32 causes the cooling fan 6 to rotate in the reverse direction for the second predetermined time period. As a result, in a construction site where there is a relatively small amount of debris, the operator does not need to operate the reverse rotation signal output switch 36 and the operator's time and labor can be reduced. Besides, clogging of the filter 8 can be prevented and deterioration of the cooling efficiency of the heat exchanger unit 4 can be reliably prevented.

In the illustrated embodiment, when the reverse rotation signal is output from the reverse rotation signal output switch 36, the controller 32 causes the cooling fan 6 to rotate in the reverse direction for the second predetermined time period, even if the operation time period of forward rotation counted by the timer 34 has not reached the first predetermined time period. As a result, in a construction site where there is a relatively large amount of debris, the operator operates the reverse rotation signal output switch 36 at an appropriate timing, thereby suppressing the clogging of the filter 8 and reliably preventing deterioration of the cooling efficiency of the heat exchanger unit 4.

Further, in the illustrated embodiment, not only in a case where the reverse rotation of the cooling fan 6 has been performed due to the operation time period of forward rotation reaching the first predetermined time period, but also in a case where the reverse rotation of the cooling fan 6 has been performed due to the operation of the reverse rotation signal output switch 36 by the operator, the controller 32 resets the timer 34 at the time of finishing the reverse rotation of the cooling fan 6, so that the reverse rotation of the cooling fan 6 is never performed at an interval shorter than necessary.

In the aforementioned example of the reverse rotation processing of the cooling fan 6, although the state of temperatures of various fluids being at or below the threshold temperature and the state of the hydraulic circuit being locked have been described as reverse rotation starting and reverse rotation continuing conditions of the cooling fan 6, these may be optional conditions.

The invention claimed is:

1. A construction machine comprising:

a heat exchanger unit disposed in an engine room of the construction machine, having a plurality of heat exchangers including an oil cooler, a radiator, and an aftercooler;

a cooling fan disposed adjacent to the heat exchanger unit in the engine room and configured to rotate in a forward rotation or a reverse direction, and supply cooling air to the heat exchanger unit during the forward rotation;

a plurality of temperature sensors, sensing a hydraulic oil temperature of hydraulic oil passing through the oil cooler, an engine cooling water temperature of engine cooling water passing through the radiator, and an air temperature sensor sensing compressed air temperature passing through the aftercooler;

a timer configured to count an operation time period of forward rotation of the cooling fan;

a reverse rotation signal output switch configured to output a reverse rotation signal an automatic mode switch configured to output an automatic mode signal;

a reverse rotation warning indicator; and a controller configured to:

rotate, in response to receipt of the automatic mode signal, the cooling fan in the reverse direction for a second predetermined time period and reset the timer, if the operation time period of forward rotation counted by the timer reaches a first predetermined time period, rotate, in response to the reverse rotation signal, the cooling fan in the reverse direction for the second predetermined time period and reset the timer, disable the cooling fan from rotating in the reverse direction and activate a warning, when a temperature signal received by any of the plurality of temperature sensors determining that any of the hydraulic oil temperature, the engine cooling water temperature, and the compressed air temperature of the construction machine are above a threshold temperature.

2. The construction machine according to claim 1, further comprising:

a compressor configured to compress a refrigerant for an air conditioner; and a condenser configured to condense the refrigerant compressed by the compressor, wherein the heat exchanger unit includes the condenser, and the controller is further configured to stop the operation of the compressor when the cooling fan rotates in the reverse direction.

3. The construction machine according to claim 1, further comprising a filter disposed on the upstream side of the heat exchanger unit.

* * * * *